Patented Nov. 20, 1945

2,389,228

UNITED STATES PATENT OFFICE 2,389,228

PREPARATION OF TRIPENTAERYTHRITOL OCTANITRATE

Joseph A. Wyler, Allentown, Pa., assignor to Trojan Powder Company, Allentown, Pa.

No Drawing. Application April 14, 1943, Serial No. 483,069

2 Claims. (Cl. 260—467)

This invention relates to a new composition of matter. More particularly it relates to a new octanitrate explosive.

In my copending application S. N. 480,331, filed March 24, 1943, is disclosed a new compound of the formula $C_{15}H_{24}O_2(OH)_8$ which I have called "tripentaerythritol."

It is an object of the present invention to convert this tripentaerythritol to an explosive. A further object is to prepare the octanitrate, $C_{15}H_{24}O_2(NO_3)_8$. Other and further objects will become apparent upon a perusal of this specification.

I have found that tripentaerythritol can be nitrated to the octanitrate and that the latter is useful as an explosive.

In order to show how my new compound may be prepared the following example, in which all parts are by weight, is given.

Example 1 part of tripentaerythritol was added slowly, with stirring, to 8 parts of 99% $HNO_3$ at a temperature of 0° C. to 10° C. The mixture was stirred for 15 minutes after the final addition of the tripentaerythritol, drowned in 4 times its weight of ice water, stirred, and allowed to stand to cause the nitrated product to separate and to solidify. The supernatant liquid was decanted off and the solid layer crushed under water. The crystalline product was then treated with about 4 times its weight of a 1% water solution of ammonium carbonate, stirred for several hours, filtered, washed with water and dried. This product is the octanitrate of tripentaerythritol.

It should be noted that the above process may be altered in many ways and still produce my compound. It is given merely as one method for the preparation of the octanitrate of tripentaerythritol.

The nitrate nitrogen content of tripentaerythritol octanitrate prepared as described above is usually 15.23% N, by nitrometer method, whereas the theoretical content is 15.30% N.

Although the primary object of my invention is to prepare this new product, another object is to prepare it in an especially advantageous form. The tripentaerythritol as prepared from aqueous, acetonic or alcoholic media consists of irregularly shaped agglomerates which are difficult to feed into molds used in pelleting operations. However if these irregularly shaped particles are dissolved in hot chloroform to a strong solution and the latter cooled to effect crystallization below about 50° C., a clear-cut prism crystal is formed. This crystal is a distinct improvement over the agglomerations usually obtained from aqueous, acetonic, or alcoholic media for the reason mentioned above.

The properties of this new compound were found to be

Melting point_____ 82–84° C. (corr.)
Percent N_____ 15.23 (theory 15.30% N)
Molecular weight_____ 738 (theory—732)

It is insoluble in water, very soluble in hot benzene and in acetone, less soluble in alcohol and soluble in chloroform.

Due to its low melting point it may advantageously be used as a coating agent on ammonium nitrate or high melting point explosives as pentaerythritol tetranitrate, hexogen, etc., or it may be melted and poured directly into desired containers.

It is moderately sensitive to impact. A 2 kg. weight dropped 40 cm. is just sufficient to effect its detonation. This degree of sensitiveness is very advantageous and useful from the standpoint of commercial and military needs. It is also very stable toward heat.

Having disclosed a process for the preparation of my new compound and having determined and given certain characteristic properties which enable a chemist skilled in this art to identify this compound, I claim:

1. Tripentaerythritol octanitrate, $C_{15}H_{24}O_2(NO_3)_8$

2. An explosive comprising tripentaerythritol octanitrate, $C_{15}H_{24}O_2(NO_3)_8$, which melts at 82–84° C. (corr.), is soluble in chloroform and in benzene and is in the form of prism crystals.

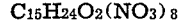
JOSEPH A. WYLER.